United States Patent
Tojo et al.

(10) Patent No.: US 10,093,786 B2
(45) Date of Patent: Oct. 9, 2018

(54) POLYCARBONATE RESIN COMPOSITION

(71) Applicant: Asahi Fiber Glass Co., Ltd., Chiyoda-ku (JP)

(72) Inventors: Chihiro Tojo, Chiyoda-ku (JP); Ippei Izumi, Chiyoda-ku (JP)

(73) Assignee: Asahi Fiber Glass Co., Ltd., Chiyoda-ku (JP)

(*) Notice: Subject to any disclaimer, the term of this patent is extended or adjusted under 35 U.S.C. 154(b) by 60 days.

(21) Appl. No.: 15/502,397

(22) PCT Filed: Jul. 31, 2015

(86) PCT No.: PCT/JP2015/071819
§ 371 (c)(1),
(2) Date: Feb. 7, 2017

(87) PCT Pub. No.: WO2016/021502
PCT Pub. Date: Feb. 11, 2016

(65) Prior Publication Data
US 2017/0218176 A1    Aug. 3, 2017

(30) Foreign Application Priority Data

Aug. 8, 2014 (JP) ................................ 2014-162179

(51) Int. Cl.
| | | |
|---|---|---|
| *C08K 5/103* | (2006.01) | |
| *C08K 5/20* | (2006.01) | |
| *C08K 5/10* | (2006.01) | |
| *C08K 3/40* | (2006.01) | |
| *C08G 64/00* | (2006.01) | |
| *C08L 69/00* | (2006.01) | |
| *B32B 27/36* | (2006.01) | |

(52) U.S. Cl.
CPC .............. *C08K 5/20* (2013.01); *B32B 27/365* (2013.01); *C08G 64/00* (2013.01); *C08K 3/40* (2013.01); *C08K 5/10* (2013.01); *C08K 5/103* (2013.01); *C08L 69/00* (2013.01)

(58) Field of Classification Search
None
See application file for complete search history.

(56) References Cited

U.S. PATENT DOCUMENTS

| 8,609,786 B2 | 12/2013 | Goossens et al. |
| 2009/0068363 A1 | 3/2009 | Smetana |
| 2010/0160575 A1 | 6/2010 | Goossens et al. |
| 2014/0094550 A1* | 4/2014 | Diaz ............... C08K 5/103 |
| | | 524/312 |

FOREIGN PATENT DOCUMENTS

| JP | 2004-250648 A | 9/2004 |
| JP | 2006-22235 A | 1/2006 |
| JP | 2006-316252 A | 11/2006 |
| JP | 2006316252 | * 11/2006 |
| JP | 2010-6922 A | 1/2010 |
| JP | 2010-506977 A | 3/2010 |
| JP | 4777621 B2 | 9/2011 |
| JP | 4777622 B2 | 9/2011 |
| JP | 2011-246564 A | 12/2011 |
| JP | 2012-126767 A | 7/2012 |

OTHER PUBLICATIONS

International Search Report dated Aug. 25, 2015, in PCT/JP2015/071819, filed Jul. 31, 2015.
Extended European Search Report dated Jan. 18, 2018 in Patent Application No. 15829039.5. citing reference AA therein, 6 pages.

* cited by examiner

*Primary Examiner* — David J Buttner
(74) *Attorney, Agent, or Firm* — Oblon, McClelland, Maier & Neustadt, L.L.P.

(57) ABSTRACT

The present invention provides a polycarbonate resin composition which is capable of maintaining favorable fluidity during molding, inhibiting a bleed-out phenomenon after molding, and further producing molding products with high transparency. Specifically, the polycarbonate resin composition comprises: an aromatic polycarbonate resin; and 0.01 to 1.0 parts by mass of a fatty acid compound relative to 100 parts by mass of the aromatic polycarbonate resin, the fatty acid compound containing at least one selected from the group consisting of fatty acid esters and fatty acid amides. The fatty acid compound has an average molecular weight of 800 to 5000. The fatty acid compound contains 10 to 80% by mass of an unsaturated fatty acid compound relative to the total mass of the fatty acid compound.

7 Claims, No Drawings

POLYCARBONATE RESIN COMPOSITION

TECHNICAL FIELD

The present invention relates to a polycarbonate resin composition, and more specifically a polycarbonate resin composition suitable for film insert injection molding.

BACKGROUND ART

Molding products made of polycarbonate resin compositions are used by taking advantage of their transparency as transparent materials in various kinds of industries, for example, for housings and the like of communication devises and personal computers.

Moreover, polycarbonate resin compositions improved in transparency and mechanical strength by being blended with glass fillers have also been developed (Patent Literatures 1 and 2).

The polycarbonate resin, however, has a high melt viscosity and poor fluidity during molding, and therefore has a problem in that the weld strength of a molding product is low.

As a solution to these problems, there is a technique for improving the fluidity of the polycarbonate resin by blending a fatty acid compound as a fluidity improver (Patent Literatures 3 to 5).

CITATION LIST

Patent Literatures

Patent Literature 1: Specification of Japanese Patent No. 4777621
Patent Literature 2: Specification of Japanese Patent No. 4777622
Patent Literature 3: Japanese Patent Application Publication No. 2010-6922
Patent Literature 4: Japanese Patent Application Publication No. 2011-246564
Patent Literature 5: Japanese Patent Application Publication No. 2012-126767

SUMMARY OF INVENTION

Technical Problems

Recently, the production of polycarbonate resin molding products have employed film insert injection molding for the purposes of improving the surface design beautifulness and surface abrasion properties of molding products, and of enhancing the productivity of the molding products. In the film insert injection molding, a color film or hard coat film is bonded to the surface of a molding product in the course of injection molding.

In this regard, the present inventor has made studies and consequently found the following problems of a fatty acid compound which has been considered so far to be effective as a fluidity improver. Specifically, when applied to film insert injection molding, the fatty acid compound tends to cause a bleed-out phenomenon on the surface of a molding product (a phenomenon in which the fluidity improver is bled out as powdery aggregates on the surface of the molding product) after the molding, and therefore acts as a cause for poor adhesion between the film and the molding product.

In addition, the bleed-out phenomenon also deteriorates the aesthetic qualities of molding products manufactured in various kinds of molding methods including a film insert injection molding method.

Solution to Problems

In order to solve the foregoing problems, the present inventor has earnestly studied and found that blending an aromatic polycarbonate resin with a specific amount of a fatty acid compound having specific physical properties as a fluidity improver makes it possible to maintain favorable fluidity during molding, inhibit a bleed-out phenomenon after molding, and further produce molding products with high transparency. Based on this finding, the present inventor has arrived at the completion of the present invention.

Specifically, the present invention relates to the following compositions and products.

1. A polycarbonate resin composition comprising:
an aromatic polycarbonate resin; and
0.01 to 1.0 parts by mass of a fatty acid compound relative to 100 parts by mass of the aromatic polycarbonate resin, the fatty acid compound containing at least one selected from the group consisting of fatty acid esters and fatty acid amides, wherein
the fatty acid compound has an average molecular weight of 800 to 5000, and
the fatty acid compound contains 10 to 80% by mass of an unsaturated fatty acid compound relative to the total mass of the fatty acid compound.

2. The polycarbonate resin composition according to the above 1, wherein the fatty acid compound has an iodine value of 60 to 120.

3. The polycarbonate resin composition according to the above 1 or 2, further comprising a glass filler.

4. The polycarbonate resin composition according to any one of the above 1 to 3, wherein
a glass filler contains, relative to the total mass of the glass filler,
50 to 60% by mass of silicon dioxide ($SiO_2$),
10 to 15% by mass of aluminum oxide ($Al_2O_3$),
15 to 25% by mass of calcium oxide (CaO),
2 to 10% by mass of titanium oxide ($TiO_2$),
2 to 8% by mass of boron oxide ($B_2O_2$).
0 to 5% by mass of magnesium oxide (MgO),
0 to 5% by mass of zinc oxide (ZnO),
0 to 5% by mass of barium oxide (BaO),
0 to 5% by mass of zirconium oxide ($ZrO_2$),
0 to 2% by mass of lithium oxide ($Li_2O$),
0 to 2% by mass of sodium oxide ($Na_2O$), and
0 to 2% by mass of potassium oxide ($K_2O$), and
the total amount of the lithium oxide ($Li_2O$), the sodium oxide ($Na_2O$), and the potassium oxide ($K_2O$) is 0 to 2% by mass relative to the total mass of the glass filler.

5. The polycarbonate resin composition according to any one of the above 1 to 4, which is a resin composition for film insert injection molding.

6. A molding product molded from the polycarbonate resin composition according to any one of the above 1 to 5.

7. The molding product according to the above 6, which is a product obtained by film insert injection molding.

Effects of Invention

As presented in Examples to be discussed later, the polycarbonate resin composition of the present invention is capable of maintaining favorable fluidity during molding, inhibiting a bleed-out phenomenon after molding, and further providing molding products with high transparency. Thus, the present invention is capable of providing a molding product excellent in moldability and aesthetic quality. Further, when applied to film insert injection molding, the present invention is capable of providing a molding product excellent also in adhesiveness between the molding product and a film.

DESCRIPTION OF EMBODIMENTS

A polycarbonate resin composition of the present invention contains, as essential components, an aromatic polycarbonate resin and a fatty acid compound containing at least one selected from the group consisting of fatty acid esters and fatty acid amides. Each of the components will be described in detail below.

Aromatic Polycarbonate Resin

As the aromatic polycarbonate resin, any thermoplastic resin containing a group derived from an aromatic compound and a carbonate bond (—O—(C=O)—O—) can be used without particular limitation.

As the aromatic compound, there are, for example, bisphenol A, bisphenol F, bisphenol B, and so on.

A specific example of the aromatic polycarbonate resin is a resin obtained by reacting bisphenol A with phosgene.

The viscosity average molecular weight of the aromatic polycarbonate resin is preferably 12000 to 35000, and more preferably 15000 to 25000 from the viewpoint of moldability. The viscosity average molecular weight can be determined in accordance with JIS K7252.

In the present invention, one kind of aromatic polycarbonate resin may be used singly, or two or more kinds of aromatic polycarbonate resins may be used in combination.

The aromatic polycarbonate resins are publicly-known substances, and can be easily obtained on the market or be prepared.

Fatty Acid Compound

The fatty acid compound used in the present invention contains an unsaturated fatty acid compound, and thus acts as a fluidity improver for improving the fluidity of an aromatic polycarbonate resin during molding. Furthermore, carbon-carbon double bonds contained in the unsaturated fatty acid compound react with oxygen during heating in molding to cause a crosslinking reaction across the unsaturated fatty acid compound, so that a bleed-out phenomenon on the surface of the molded article can be inhibited.

The fatty acid compound used in the present invention contains an unsaturated fatty acid compound in an amount of 10 to 80% by mass, preferably 20 to 70% by mass, and more preferably 25 to 60% by mass relative to the total mass of the fatty acid compound.

The unsaturated fatty acid compound refers to one obtained from an unsaturated fatty acid of fatty acid ester and fatty acid amide constituting the fatty acid compound (in short, refers to an unsaturated fatty acid ester or unsaturated fatty acid amide).

When the content of the unsaturated fatty acid compound is 10% by mass or more, a bleed-out phenomenon after molding can be sufficiently inhibited, and the aesthetic quality of a film insert-molding product, in particular, can be well maintained.

Meanwhile, when the content of the unsaturated fatty acid compound is 80% by mass or less, a degree of crosslinking across the unsaturated fatty acid compound generated due to heating in a compounding step of kneading the aromatic polycarbonate resin and the fatty acid compound can be kept from becoming too high, and therefore the fatty acid compound can exhibit a sufficient fluidity improving effect during molding to be performed after the compounding step.

The content of the unsaturated fatty acid compound can be determined by using any means used in fat and oil analyses without particular limitation. In one possible example, the fatty acid compound is hydrolyzed, and then the content is determined by a gas chromatograph mass spectrometry after any process among methyl esterification by a boron trifluoride-methanol method, pyrrolidide derivatization, and dimethyl disulfide derivatization. Instead, when a reaction used to produce a fatty acid compound is a reaction that allows the content of the unsaturated fatty acid in the produced fatty acid compound to be specified in advance, the content of the unsaturated fatty acid compound may be determined from the ratio of the unsaturated fatty acid blended before the reaction without measuring the content of the unsaturated fatty acid compound in the reaction product.

As the fatty acid ester constituting the fatty acid compound of the present invention, any compound obtained by condensation reaction of a fatty acid with a hydroxyl group-containing compound can be used in the present invention without particular limitation.

The fatty acid is classified into saturated fatty acid and unsaturated fatty acid.

As the saturated fatty acid, palmitic acid, stearic acid or arachidic acid having 16 to 20 carbon atoms is preferable, and stearic acid is more preferable.

Examples of the unsaturated fatty acid include ricinoleic acid, oleic acid, linoleic acid, linolenic acid, hexadecenoic acid, eicosenoic acid, erucic acid, docosadienoic acid and the like. As the unsaturated fatty acid, oleic acid or linoleic acid is more preferable.

Examples of the hydroxyl group-containing compound include glycols [for example, ethylene glycol, propylene glycol, 1,4-butanediol, 1,5-pentanediol, neopentanediol, 1,6-hexanediol, 1,4-cyclohexanediol, 1,7-heptanediol, 1,8-octanediol, etc.]; sugar alcohols [for example, tritol (glycerin), tetritol (erythritol), pentitol (ribitol, xylitol, etc.), hexitol (sorbitol, mannitol, etc.), peptitol, octitol, etc.]; monosaccharides [for example, triose (glyceraldehyde), tetrose (erythrose, threose, etc.), pentose (ribose, ribulose, xylose, xylulose, lyxose, etc.), hexose (glucose, galactose, mannose, fructose, etc.), heptose, etc.]; polyglycerin [for example, tetraglycerin, hexaglycerin, etc.]; starch; polyvinyl alcohol; and so on.

As the hydroxyl group-containing compound, glycerin, sorbitol, glucose or polyglycerin is preferable, and polyglycerin is more preferable.

As the fatty acid amide constituting the fatty acid compound of the present invention, any compound obtained by a condensation reaction of a fatty acid with a polyamine can be used in the present invention without particular limitation.

As the fatty acid, the acids same as those of the fatty acid ester can be used.

As the polyamine, there are aliphatic polyamines [for example, ethylenediamine, diethylenetriamine, triethylenetetramine, tetraethylenepentamine, pentaethylenehexamine, 1,2-diaminopropane, 1,3-diaminopropane, 1,4-diaminobutane, 1,6-diaminohexane, 3,3'-iminobis(propylamine), 3-(methylamino)propylamine, 3-(dimethylamino)propylamine, 3-(ethylamino)propylamine, 3-(butylamino)propylamine, N-methyl-3,3'-iminobis(propylamine), polyethyleneimine, etc.]; aromatic polyamines [for example, phenylenediamine, o-tolidine, m-toluylenediamine, m-xylylenediamine, dianisidine, diaminodiphenyl ether, 1,4-diaminoanthraquinone, 3,3'-dimethyl-4,4'-diaminobiphenyl, 4,4'-diaminobenzanilide, 4,4'-diamino-3,3'-diethyldiphenylmethane, etc.]; heterocyclic amines [for example, piperazine, 2-methylpiperazine, 1-(2-aminoethyl)piperazine, 2,5-dimethylpiperazine, cis-2,6-dimethylpiperazine, bis(aminopropyl)piperazine, 1,3-di(4-piperidyl)propane, 3-amino-1,2,4-triazole, 1-aminoethyl-2-methylimidazole, etc.]; and so on.

The fatty acid amide used in the present invention is not particularly limited, but fatty acid amides composed of aliphatic polyamines are preferred because they can exhibit a high fluidity improving effect of an aromatic polycarbonate resin when added even in a small amount, and cause coloring to a molding product only to a small degree.

The fatty acid compound used in the present invention may contain any one of the above-mentioned fatty acid esters and fatty acid amides alone, or may contain any combination of the fatty acid esters and the fatty acid amides.

Note that use of a fatty acid ester as the fatty acid compound is more preferred in order that the aesthetic quality of a film insert molding product can be improved by taking advantage of the transparency of an aromatic polycarbonate resin.

The average molecular weight of the fatty acid compound used in the present invention is 800 to 5000, preferably 1000 to 5000, and more preferably 1000 to 4000.

When the average molecular weight is 800 to 5000, the fatty acid compound when blended in an aromatic polycarbonate resin can maintain favorable fluidity of the resin composition during molding and also inhibit a bleed-out phenomenon after molding.

In addition, when the average molecular weight is 800 or more, vaporization of the fatty acid ester and the fatty acid amide due to heating in the compounding step of kneading the aromatic polycarbonate resin and the fatty acid compound is inhibited, which makes it possible to obtain a desired fluidity improving effect and reduce the risk of fire.

When the average molecular weight is 5000 or less, the fatty acid compound when blended in the aromatic polycarbonate resin can sufficiently improve the fluidity of the resin composition during molding.

The average molecular weight of the fatty acid compound can be determined in accordance with JIS K7252.

The iodine value of the fatty acid compound used in the present invention is preferably 60 to 120, and more preferably 70 to 100. The iodine value indicates the mass of iodine capable of addition-reaction with carbon-carbon double bonds contained in the fatty acid compound. Therefore, the higher the iodine value, the larger the number of carbon-carbon double bonds contained in the fatty acid compound.

Having an iodine value of 60 or more, the fatty acid compound when blended in the aromatic polycarbonate resin can achieve a higher degree of inhibiting a bleed-out phenomenon after molding.

On the other hand, having an iodine value of 120 or less, the fatty acid compound is capable of: keeping a degree of oxygen-crosslinking among unsaturated fatty acids generated during heating from becoming too high; when blended in the aromatic polycarbonate resin, producing a sufficient effect of improving the fluidity of the resin composition during molding; and further inhibiting a problem in that the aromatic polycarbonate resin becomes so brittle that the mechanical strength of the aromatic polycarbonate resin is greatly impaired.

When the iodine value is in the range of 60 to 120, the fatty acid compound when blended in the aromatic polycarbonate resin can improve the fluidity during molding and inhibit a bleed-out phenomenon after molding.

The iodine value of the fatty acid ester and the fatty acid amide can be determined in accordance with JIS K0070.

The fatty acid compounds having the above physical properties are publicly-known substances, and can be easily obtained on the market or be prepared.

In the present invention, the amount of the fatty acid compound blended is 0.01 to 1.0 parts by mass, preferably 0.01 to 0.5 parts by mass, and more preferably 0.01 to 0.1 parts by mass relative to 100 parts by mass of the aromatic polycarbonate resin.

When the amount of the fatty acid compound blended is 0.01 to 1.0 parts by mass, it is possible to exhibit predetermined blending effects (of imparting favorable fluidity during molding, inhibiting a bleed-out phenomenon after molding, and providing a molding product with high transparency), and further to suppress color change (yellowing) of the molding product.

The fatty acid compound blended in an amount of 0.01 parts by mass or more is capable of exhibiting favorable fluidity during molding. On the other hand, the fatty acid compound blended in an amount of 1.0 parts by mass or less is capable of: keeping a degree of oxygen-crosslinking among unsaturated fatty acids generated during heating from becoming too high; producing a sufficient effect of improving the fluidity of the resin composition during molding when blended in the aromatic polycarbonate resin; also sufficiently inhibiting a problem in that, when the fatty acid compound is blended over a limit concentration of compatibility with the aromatic polycarbonate resin, a molding product becomes cloudy due to hazing and the transparency of the aromatic polycarbonate resin is impaired; and further sufficiently inhibiting a problem in that the aromatic polycarbonate resin becomes so brittle that the mechanical strength of the aromatic polycarbonate resin is greatly impaired.

In the polycarbonate resin composition of the present invention (hereinafter also referred to as the resin composition of the present invention), a glass filler can be blended as an optional component in order to improve the mechanical strength while maintaining the transparency.

As the glass filer, any one blendable in a polycarbonate resin can be used in the present invention without any particular limitation, but the glass fillers described in the specifications of Japanese Patent Nos. 4777621 (Patent Literature 1) and 4777622 (Patent Literature 2) are preferable because they can also improve the transparency of the polycarbonate resin in addition to the mechanical strength.

A specific example of such a preferable glass filler is one which contains, relative to the total mass of the glass filler, 50 to 60% by mass of silicon dioxide ($SiO_2$), 10 to 15% by mass of aluminum oxide ($Al_2O_3$), 15 to 25% of calcium oxide (CaO), 2 to 10% by mass of titanium oxide ($TiO_2$), 2 to 8% by mass of boron oxide ($B_2O_3$), 0 to 5% by mass of magnesium oxide (MgO), 0 to 5% by mass of zinc oxide (ZnO), 0 to 5% by mass of barium oxide (BaO), 0 to 5% by mass of zirconium oxide ($ZrO_2$), 0 to 2% by mass of lithium oxide ($Li_2O$), 0 to 2% by mass of sodium oxide ($Na_2O$), and 0 to 2% by mass of potassium oxide ($K_2O$), and in which the total amount of the lithium oxide ($Li_2O$), the sodium oxide ($Na_2O$), and the potassium oxide ($K_2O$) is 0 to 2% by mass relative to the total mass of the glass filler.

An amount of the glass filler blended may be set as appropriate within such a range that the effects of the present invention will not be impaired, but the amount may be, for example, 2 to 30% by mass relative to the total mass of the aromatic polycarbonate resin and the glass filler. Here, it is preferable to appropriately adjust the amount of the glass filler blended according to an intended use of a molding product.

When a glass filler is blended in the resin composition, there may occur a case where part of the glass filler existing in the outermost surface of a molding product obtained from the resin composition increases the surface roughness of the molding product, and also increases the diffused reflection on the surface of the molding product with the result that the transparency of the molding product decreases. Such decrease in the transparency may be overcome by forming a layer (skin layer) having a high abundance ratio of polycarbonate resin over the outermost surface of the molding product, and thereby decreasing the surface roughness of the molding product. For example, in the case of using an injection molding method, it is possible to form the skin layer by setting the temperature of a molding die to be higher than in a general condition so that the resin in contact with the molding die can easily flow. In the case of using a press molding method, the surface roughness of the outermost surface of the molding product can be decreased by setting the pressure during molding to be higher than in a general condition. A decrease in the surface roughness of the molding product by using any of these methods results in reductions in irregular reflection and haze on the surface of the molding product, and consequently can lead to improvement of the transparency of the molding product.

Furthermore, the resin composition of the present invention may be blended with any well-known additive other than the above-described glass filler as an optional component as long as the predetermined effects of the present invention and the properties of the resin composition such as the refractive index will not be impaired. For example, when blended with an antioxidant, the resin composition can be inhibited from degrading during manufacturing or molding.

When containing no glass filler, the resin composition of the present invention has a fluidity represented by a melt flow rate (MFR) of preferably 30 g/10 minutes to 60 g/10 minutes and more preferably 40 g/10 minutes to 50 g/10 minutes. Meanwhile, when containing a glass filler, for example, when containing 10% by mass of a glass filler, the resin composition has an MFR of preferably 15 g/10 minutes to 40 g/10 minutes, and more preferably 20 g/10 minutes to 40 g/10 minutes. Having the aforementioned ranges of the MFR, the resin composition can achieve excellent moldability. The MFR can be determined by a determination method specified in JIS K7210.

The resin composition of the present invention can be produced by using any of methods conventionally known as methods for producing polycarbonate resin compositions without any particular limitation. A preferable production method is, for example, a method in which an aromatic polycarbonate resin, a fluidity improver (a fatty acid compound containing at least one selected from the group consisting of fatty acid esters and fatty acid amides), and an optional component are mixed in a mixer or the like and are melt-kneaded in an extruder to form pellets.

Production conditions can be set as needed and are not particularly limited. However, a heating temperature during melt-kneading in a range of 220° C. to 300° C. is preferable because degradation of the aromatic polycarbonate resin can be inhibited.

The resin composition of the present invention can be formed into a molding product by applying any of methods conventionally known as molding methods for polycarbonate molding products without any particular limitation. The molding methods are, for example, an injection molding method, an extrusion molding method, a compression molding method, a calendar molding method, and the like.

Among them, the injection molding method, particularly a film insert injection molding method can suitably use the resin composition of the present invention.

The film insert injection molding method is a method for producing an article in which a film such as a decorative film or a hard coat film and a polycarbonate resin molding product are integrated with each other by: inserting the film into an injection molding die; and injecting a molding resin material (a resin composition of the present invention) molten by heating into the molding die with pressurize, followed by cooling and solidification.

Use of the resin composition of the present invention inhibits a phenomenon (bleed-out phenomenon) in which the fluidity improver is bled out as powdery aggregates on the surface of a molding product after molding, so that an article excellent in adhesiveness between the film and the molding product can be produced.

As the film, any publicly-known film applicable to the film insert injection molding can be used without particular limitation. Specific examples include a decorative film (for example, a film with letters or the like printed thereon or a color film) for imparting design beautifulness to a molding product, a protective film (for example, a hard coat film) for protecting a molding product, and other functional films (for example, an antifog film, an antistatic film, and an antireflection film) and the like.

Among them, the hard coat film can be preferably used because the hard coat film has good weather resistance and can prevent aging abrasion of the surface of the molding product. A material for the hard coat film is not particularly limited, and it is possible to use any of publicly-known materials such as an acrylate-based hard coat agent, a silicone-based hard coat agent, and an inorganic hard coat agent. As a base film for the hard coat film, a polyethylene terephthalate film can be used, for example.

The film used in the film insert injection molding method may be a single film or a composite film in which two or more films are laminated.

Molding conditions can be set as appropriate, and are not particularly limited. However, it is preferable that the resin temperature during molding be in a range of 220° C. to 300° C. because degradation of the aromatic polycarbonate resin can be inhibited.

The thickness of a molding product molded from the resin composition of the present invention (hereinafter also referred to as the molding product of the present invention) is not particularly limited but can be set as appropriate according to an intended use of the molding product. When any of the glass fillers described in the above-mentioned Patent Literatures 1 and 2 is blended, the thickness of the molding product is preferably 0.3 to 20 mm, and more preferably 0.5 mm to 5 mm. When the thickness of the molding product is 0.3 to 20 mm, it is possible to obtain the molding product which is less likely to warp and is excellent in the mechanical strength and the transparency.

In the molding product of the present invention, the surface roughness represented by the 60° specular glossiness defined in the optical property testing method of plastics in JIS-K7105 is preferably 130 or more. When the 60° specular glossiness is 130 or more, it is possible to further improve the transparency of the molding product by suppressing irregular reflection on the outermost surface of the molding product.

In the molding product of the present invention, the total luminous transmittance to visible light is preferably 86% or more and more preferably 88% or more. When the total luminous transmittance to visible light is 86% or more, the molding product can be suitably used for applications requiring high transparency. The total luminous transmittance to visible light can be determined in accordance with JIS-K7361.

The molding product of the present invention has a haze of preferably 10% or less and more preferably 5% or less. When the haze is 10% or less, the molding product can be suitably used for applications requiring high transparency. The haze can be determined in accordance with JIS-K7105.

The molding product of the present invention can be used for the same applications as those for conventionally known polycarbonate resin molding products without particular limitation. Preferably, the molding product can be used to form a part of an article which needs to allow the inside of the article to be recognized, for example an outer plate, a housing, and an opening member. Specific examples thereof include the following parts (1) to (6):

(1) Parts for electrical instruments such as various parts, outer plates, and housings of televisions, radio cassettes, video cameras, video tape recorders, audio players, DVD players, telephones, displays, computers, registers, copiers, printers, and facsimiles;

(2) Parts for precision and other instruments such as cases and covers of precision machines including mobile phones, PDAs, cameras, slide projectors, watches/clocks, calculators, measuring instruments, display devices, and the like;

(3) Parts for automobiles such as sunroofs, door visors, rear windows, and side windows;

(4) Construction parts such as building glasses, soundproof walls, carports, solar rooms, and gratings;

(5) Agricultural parts such as plastic greenhouses and hothouses; and (6) Furniture parts such as lighting covers, blinds, and interior accessories.

EXAMPLES

Next, the effects of the present invention will be specifically described with reference to Examples, but the present invention is not limited to these Examples.

The physical properties of components used in Examples and Comparative Examples were determined in accordance with the following determination methods.

| Physical Property | Determination Method |
| --- | --- |
| Average Molecular Weight of Polycarbonate Resin | JIS K7252 |
| Content of Unsaturated Fatty Acid Compound (Based on Total Mass of Fatty Acid Compound) | Gas Chromatograph Mass Spectrometry after Methyl Esterification Process |
| Average Molecular Weight of Fatty Acid Compound | JIS K7252 |
| Iodine Value of Fatty Acid Compound | JIS K0070 |

Example 1

A fatty acid compound containing 50% by mass of an unsaturated fatty acid ester (unsaturated fatty acid compound), and having an average molecular weight of 3600 and an iodine value of 62.8 was obtained by reacting tetraglycerol with a fatty acid mixture in which a mass ratio of stearic acid, oleic acid, and linoleic acid was 2:1:1. Then, a polycarbonate resin composition 1 was obtained by mixing 100 parts by mass of a bisphenol A polycarbonate resin having an average molecular weight of 19000 with 0.1 parts by mass of the above unsaturated fatty acid ester, followed by melt-kneading at 280° C.

Example 2

A fatty acid compound containing 73.5% by mass of an unsaturated fatty acid ester (unsaturated fatty acid compound), and having an average molecular weight of 4000 and an iodine value of 70 was obtained by reacting hexaglycerol with a fatty acid mixture in which a mass ratio of a castor oil fatty acid (8% by mass of saturated fatty acids (i.e., 2% by mass of myristic acid, 4% by mass of stearic acid, and 2% by mass of arachidic acid), and 92% by mass of unsaturated fatty acids (i.e., 88% by mass of oleic acid, 3% by mass of linoleic acid, and 1% by mass of linolenic acid)) and a palm oil fatty acid (45% by mass of saturated fatty acids (i.e., 2% by mass of myristic acid, 38% by mass of palmitic acid, and 5% by mass of stearic acid), and 55% by mass of unsaturated fatty acids (i.e., 45% by mass of oleic acid and 10% by mass of linoleic acid)) was 1:1. Then, a polycarbonate resin composition 2 was obtained by mixing 100 parts by mass of the polycarbonate resin in Example 1 with 0.02 parts by mass of the above unsaturated fatty acid ester, followed by the same method as in Example 1.

Example 3

A fatty acid compound containing 50% by mass of an unsaturated fatty acid ester (unsaturated fatty acid compound), and having an average molecular weight of 875 and an iodine value of 110 was obtained by mixing glyceryl trilinoleate having a molecular weight of 870 and glyceryl tristearate having a molecular weight of 880 at a mass ratio of 1:1. Then, a polycarbonate resin composition 3 was obtained by mixing 100 parts by mass of the polycarbonate resin in Example 1 with 0.8 parts by mass of the above unsaturated fatty acid ester, followed by the same method as in Example 1.

Example 4

A glass filler-containing polycarbonate resin composition 4 was obtained in the same method as in Example 2 except that a glass filler containing 55% by mass of silicon dioxide ($SiO_2$), 14% by mass of aluminum oxide ($Al_2O_3$), 23% by mass of calcium oxide (CaO), 2% by mass of titanium oxide ($TiO_2$), 6% by mass of boron oxide ($B_2O_3$), 0.3% by mass of magnesium oxide (MgO), 0.6% by mass of sodium oxide ($Na_2O$), and 0.1% by mass of potassium oxide ($K_2O$) and having a fiber length 0.3 mm was blended in the resin composition in Example 2 such that the glass filler accounted for 10% by mass of the total mass of the resin composition.

Comparative Example 1

A bisphenol A polycarbonate resin having an average molecular weight of 19000 (the polycarbonate resin in Example 1) was used as it was.

Comparative Example 2

A polycarbonate resin composition 5 was obtained by mixing 100 parts by mass of the polycarbonate resin in Example 1 with 0.1 parts by mass of a fatty acid compound (not containing an unsaturated fatty acid compound) composed of glyceryl tristearate having a molecular weight of 880, followed by the same method as in Example 1.

Comparative Example 3

A polycarbonate resin composition 6 was obtained by mixing 100 parts by mass of the polycarbonate resin in Example 1 with 0.1 parts by mass of a fatty acid compound composed of glyceryl trilinoleate having a molecular weight of 870, containing 100% by mass of unsaturated fatty acid ester (unsaturated fatty acid compound), and having an iodine value of 160, followed by the same method as in Example 1.

Comparative Example 4

A polycarbonate resin composition 7 was obtained in the same method as in Example 2 except that the amount of the fatty acid compound in Example 2 was changed to 1.2 parts by mass.

Comparative Example 5

A glass filler-containing polycarbonate resin composition 8 was obtained by blending the polycarbonate resin used in Example 1 with the glass filler used in Example 4 such that the glass filler accounted for 10% by mass of the total mass of the composition, followed by melt-kneading at 280° C.

Comparative Example 6

A glass filler-containing polycarbonate resin composition 9 was obtained in the same method as in Comparative Example 2 except that the glass filler used in Example 4 was blended in the resin composition in Comparative Example 2 such that the glass filler accounted for 10% by mass of the total mass of the composition.

Evaluation Example 1

The MFR of each of the aromatic polycarbonate resin and the polycarbonate resin compositions of Examples 1 to 4 and Comparative Examples 1 to 6 was determined at a temperature of 280° C. under a load of 2.16 kgf in accordance with JIS K7210.

Evaluation Example 2

A test piece of 90 mm×45 mm with a thickness of 1 mm was injection-molded from each of the aromatic polycarbonate resin and the polycarbonate resin compositions of Examples 1 to 4 and Comparative Examples 1 to 6 at a melting temperature of 280° C. and a molding-die temperature of 120° C., and the total luminous transmittance of the test piece was determined in accordance with JIS K7361.

Evaluation Example 3

A test piece of 90 mm×45 mm with a thickness of 3 mm was prepared by film insert injection-molding of each of the aromatic polycarbonate resin and the polycarbonate resin compositions of Examples 1 to 4 and Comparative Examples 1 to 6 at a melting temperature of 280° C. and a molding-die temperature of 120° C. using a polyethylene terephthalate film of 25 µm.

Then, cuts in a grid form having 100 squares with a width of 2 mm were made on the film side of the test piece by a commercially available cutter, and a cellophane tape peeling test was carried out to evaluate the adhesion strength of the film. In this test, the number of squares from which the film peeled off was counted among the 100 squares, and the adhesive force was determined such that the smaller the number, the higher the adhesive force.

The evaluation results are presented in Table 1 (not blended with the glass filler) and Table 2 (blended with the glass filler) below.

TABLE 1

|  | Ex. 1 | Ex. 2 | Ex. 3 | Comp. Ex. 1 | Comp. Ex. 2 | Comp. Ex. 3 | Comp. Ex. 4 |
|---|---|---|---|---|---|---|---|
| MFR (g/10 min.) | 53 | 43 | 37 | 20 | 48 | 29 | 64 |
| Total Luminous Transmittance (%) | 89.6 | 91.5 | 88.7 | 90.7 | 88.4 | 86.0 | 85.1 |
| Cellophane Tape Peeling | 0/100 | 0/100 | 0/100 | 0/100 | 46/100 | 0/100 | 0/100 |

TABLE 2

|  | Ex. 4 | Comp. Ex. 5 | Comp. Ex. 6 |
|---|---|---|---|
| MFR (g/10 min.) | 23 | 13 | 25 |
| Total Luminous Transmittance (%) | 88.6 | 88.3 | 87.1 |
| Cellophane Tape Peeling | 0/100 | 0/100 | 42/100 |

The MFR of Evaluation Example 1 is an index of the fluidity during molding of a polycarbonate resin composition.

The cellophane tape peeling property of Evaluation Example 3 is an index of adhesiveness between a molding product and a film, the adhesiveness being affected by a bleed-out phenomenon.

The total luminous transmittance of Evaluation Example 2 is an index of the transparency of a molding product.

Tables 1 and 2 present that the polycarbonate resin compositions of Examples are capable of maintaining favorable fluidity during molding, inhibiting a bleed-out phenomenon after molding, and further producing molding products with high transparency.

INDUSTRIAL APPLICABILITY

Polycarbonate resin compositions of the present invention can be used as transparent materials in various industrial fields.

The invention claimed is:
1. A polycarbonate resin composition comprising:
   an aromatic polycarbonate resin; and
   0.01 to 1.0 parts by mass of a fatty acid compound relative to 100 parts by mass of the aromatic polycarbonate resin, the fatty acid compound comprising at least one selected from the group consisting of fatty acid esters and fatty acid amides,
   wherein the fatty acid compound has an average molecular weight of 800 to 5000, and the fatty acid compound comprises 10 to 80% by mass of an unsaturated fatty acid compound relative to the total mass of the fatty acid compound.

2. The polycarbonate resin composition according to claim 1, wherein the fatty acid compound has an iodine value of 60 to 120.

3. The polycarbonate resin composition according to claim 1, further comprising a glass filler.

4. The polycarbonate resin composition according to claim 3, wherein the glass filler comprises, relative to the total mass of the glass filler:

50 to 60% by mass of silicon dioxide ($SiO_2$),
10 to 15% by mass of aluminum oxide ($Al_2O_3$),
15 to 25% by mass of calcium oxide (CaO),
2 to 10% by mass of titanium oxide ($TiO_2$),
2 to 8% by mass of boron oxide ($B_2O_3$),
0 to 5% by mass of magnesium oxide (MgO),
0 to 5% by mass of zinc oxide (ZnO),
0 to 5% by mass of barium oxide (BaO),
0 to 5% by mass of zirconium oxide ($ZrO_2$),
0 to 2% by mass of lithium oxide ($Li_2O$),
0 to 2% by mass of sodium oxide ($Na_2O$), and
0 to 2% by mass of potassium oxide ($K_2O$), and wherein the total amount of the lithium oxide ($Li_2O$), the sodium oxide ($Na_2O$), and the potassium oxide ($K_2O$) is 0 to 2% by mass relative to the total mass of the glass filler.

5. The polycarbonate resin composition according to claim 1, which is a resin composition suitable for film insert injection molding.

6. A molding product molded from the polycarbonate resin composition according to claim 1.

7. The molding product according to claim 6, which is a product obtained by film insert injection molding.

* * * * *